(12) United States Patent
Capitani

(10) Patent No.: US 9,972,990 B2
(45) Date of Patent: May 15, 2018

(54) ASSEMBLY FOR TIGHTLY COVERING AN ELONGATE MEMBER WITH A PROTECTIVE ELASTIC TUBULAR BODY

(71) Applicant: SOCIETE INDUSTRIELLE DE CONSTRUCTION D'APPAREILS ET DE MATERIEL ELECTRIQUES, Arnac Pompadour (FR)

(72) Inventor: Adrien Capitani, Magnac Bourg (FR)

(73) Assignee: SOCIETE INDUSTRIELLE DE CONSTRUCTION D'APPAREILS ET DE MATERIEL ELECTRIQUES, Arnac Pompadour (FR)

( * ) Notice: Subject to any disclaimer, the term of this patent is extended or adjusted under 35 U.S.C. 154(b) by 0 days. days.

(21) Appl. No.: 15/220,462

(22) Filed: Jul. 27, 2016

(65) Prior Publication Data
US 2017/0033545 A1    Feb. 2, 2017

(30) Foreign Application Priority Data

Jul. 28, 2015   (FR) ..................... 15 57229

(51) Int. Cl.
| H02G 15/06 | (2006.01) |
| H02G 15/18 | (2006.01) |
| H02G 15/04 | (2006.01) |
| H02G 1/14 | (2006.01) |

(52) U.S. Cl.
CPC ............... *H02G 15/06* (2013.01); *H02G 1/14* (2013.01); *H02G 15/043* (2013.01); *H02G 15/1826* (2013.01)

(58) Field of Classification Search
CPC ........ H02G 15/06; H02G 1/14; H02G 15/043; H02G 15/1826
USPC ......................................... 174/73.1
See application file for complete search history.

(56) References Cited

U.S. PATENT DOCUMENTS

| 6,049,960 A | 4/2000 | Pilling et al. |
| 6,444,913 B1 * | 9/2002 | Kao .................. H02G 1/14 |
| | | 174/73.1 |

FOREIGN PATENT DOCUMENTS

| DE | 474 991 C | 10/1929 |
| EP | 0 815 624 A1 | 1/1998 |
| WO | 95/11542 A1 | 4/1995 |
| WO | 02/07280 A1 | 1/2002 |

* cited by examiner

*Primary Examiner* — Dhirubhai R Patel
(74) *Attorney, Agent, or Firm* — Young & Thompson

(57) ABSTRACT

The assembly includes a protective elastic tubular body and a tubular core for holding the tubular body expanded including a first part and a second part which are associated, the core being in an operating position in which the second part covers the first part, and being configured for an elongate member to be inserted into its internal space in operating position and for a pull then applied to the first part to make it slide relative to the second part to reach an extended position in which it can no longer move in relation to the second part; the second part including legs projecting axially from a collar and connected to each other exclusively by the collar; in the operating position the collar and legs surround the first part; and in the extended position the collar surrounds the first part and the legs are axially beyond the first part.

18 Claims, 3 Drawing Sheets

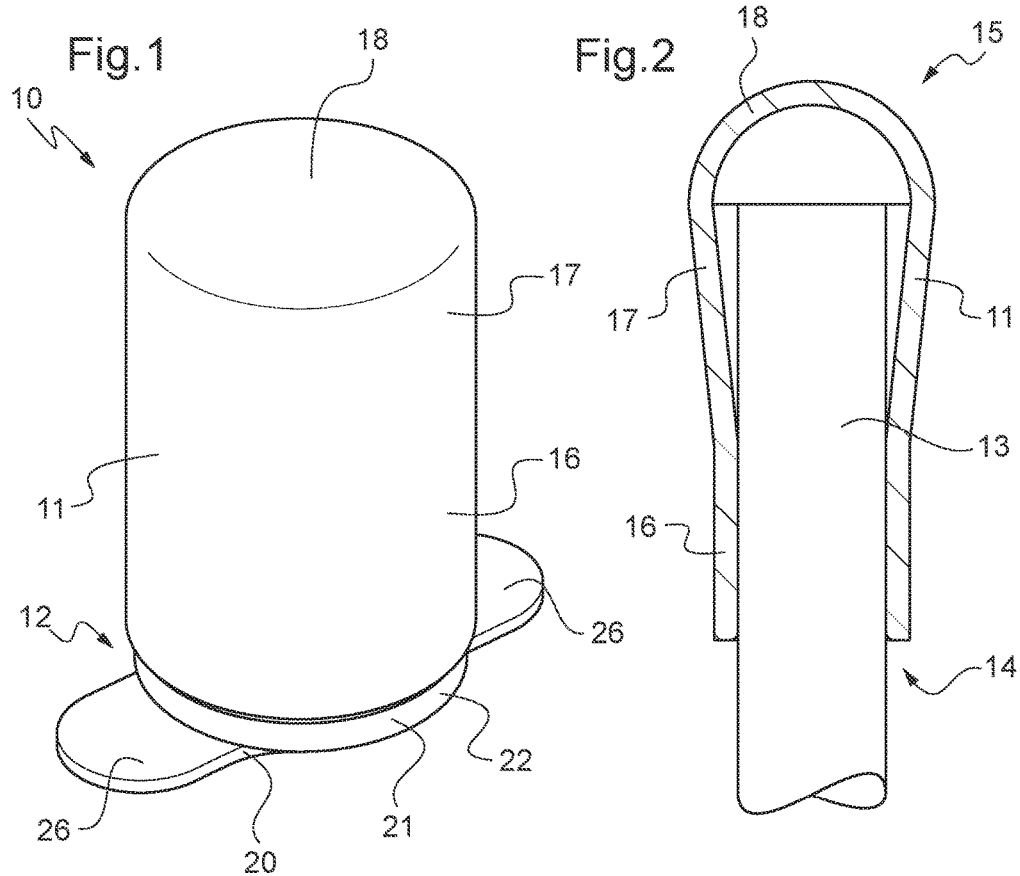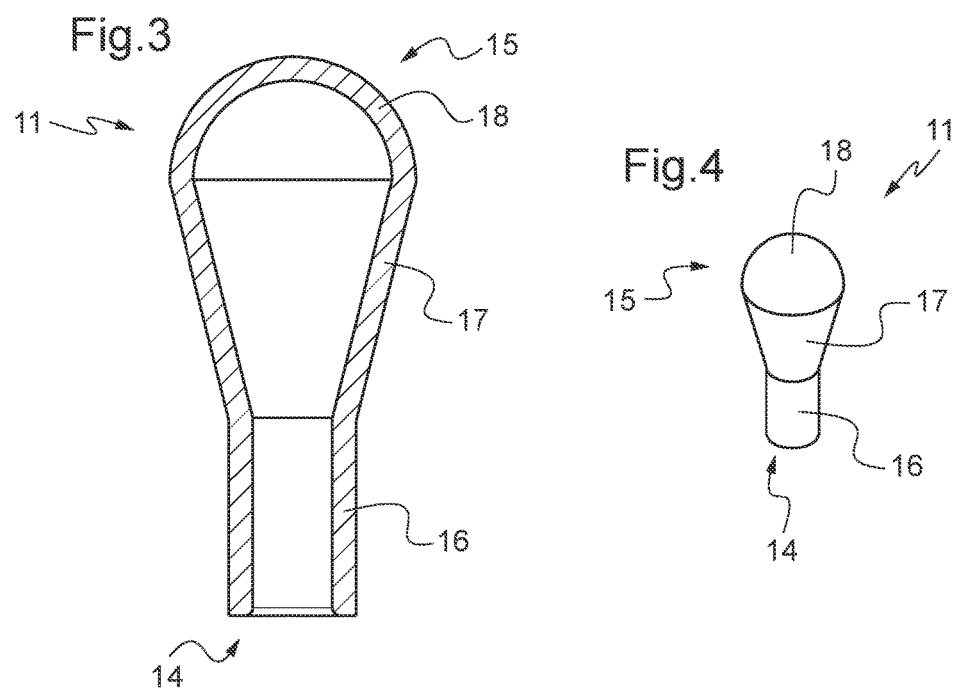

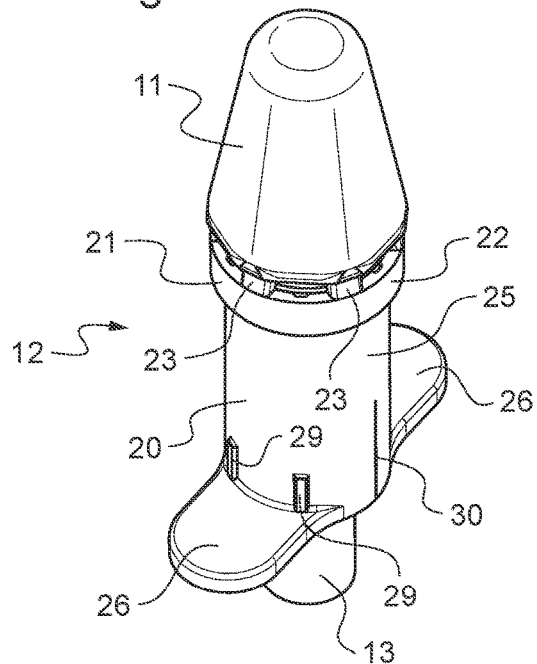
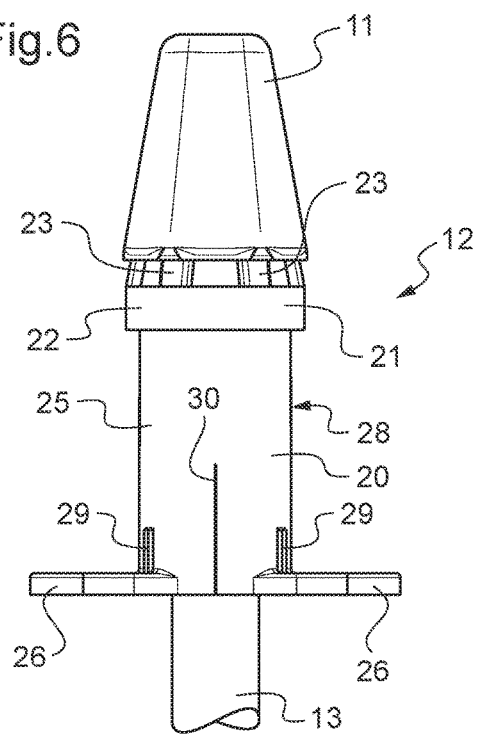
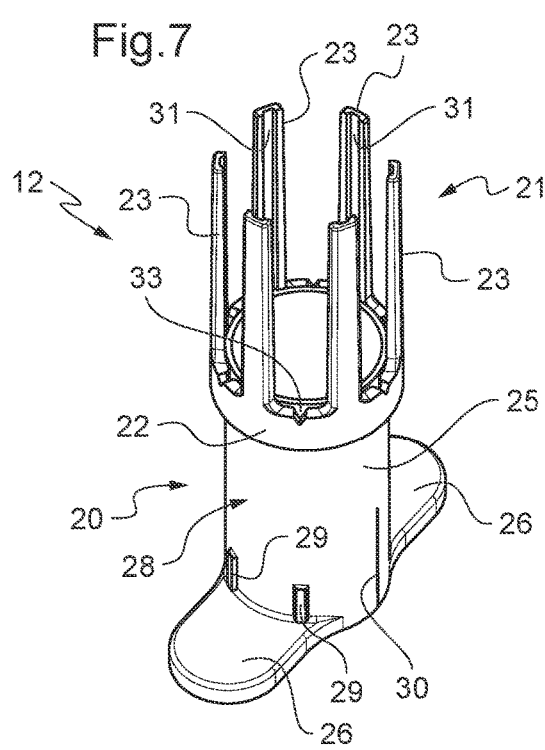
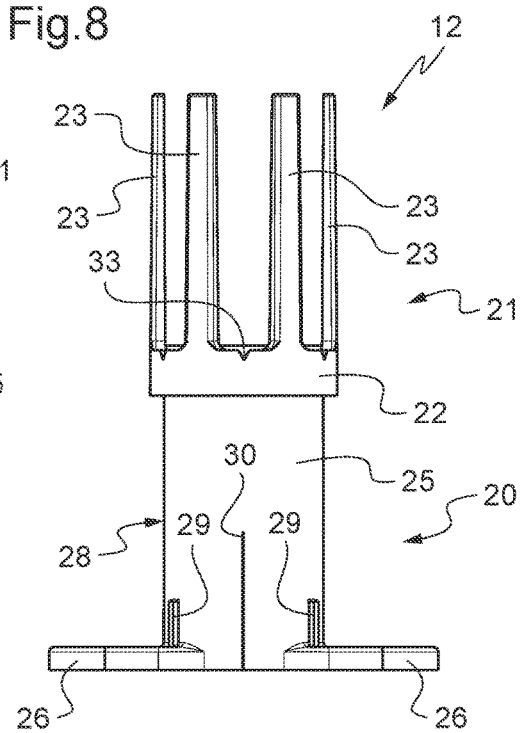

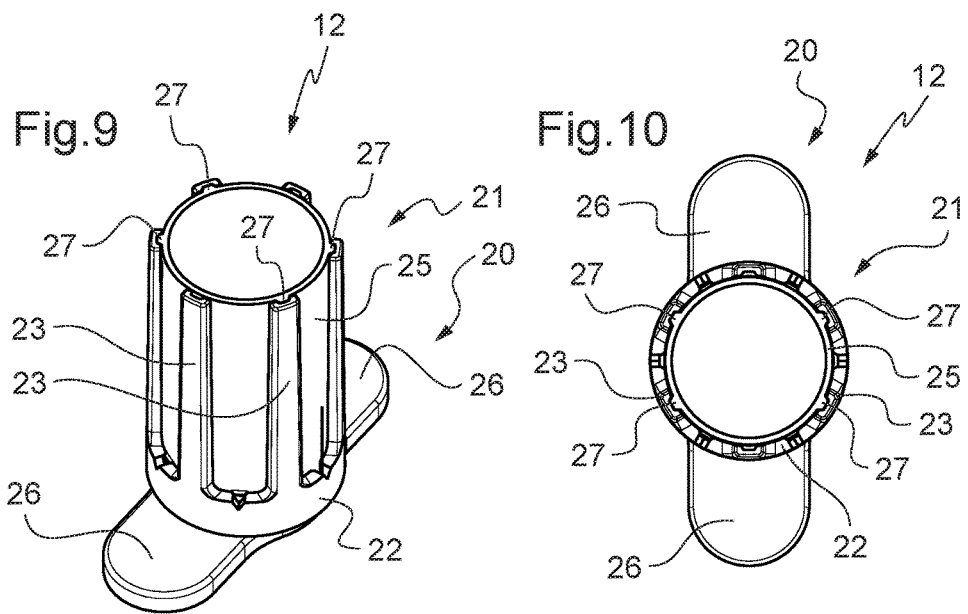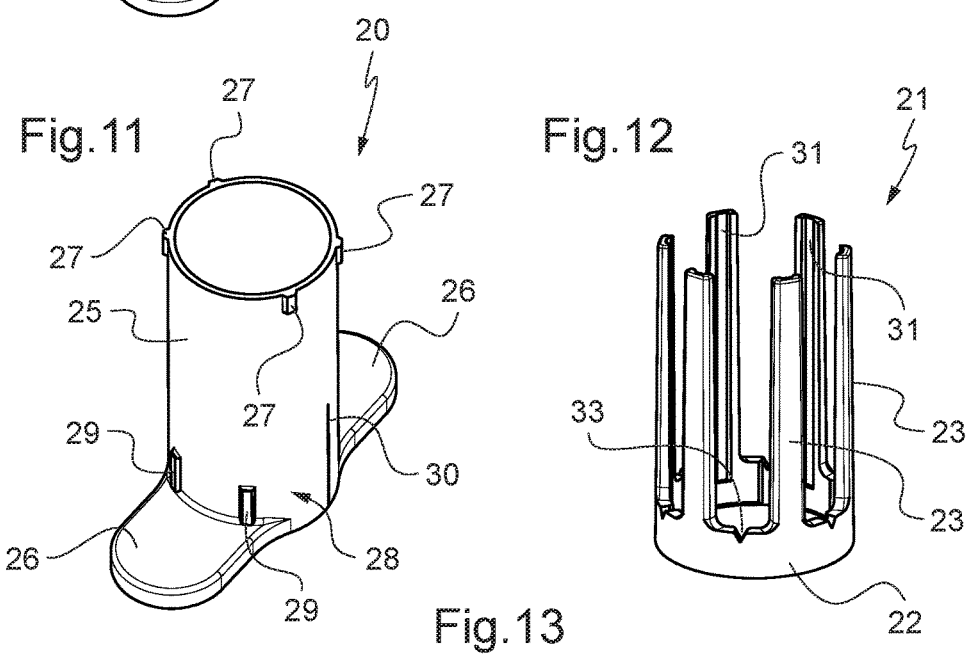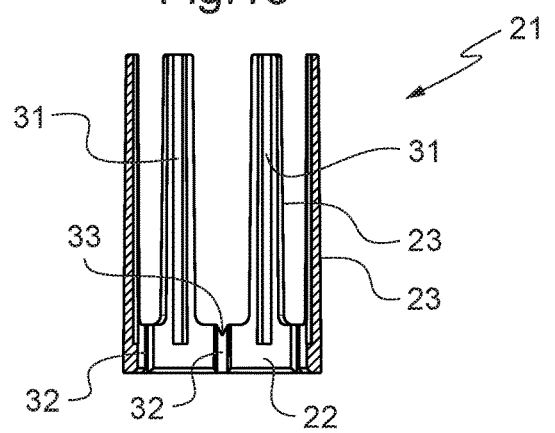

ASSEMBLY FOR TIGHTLY COVERING AN ELONGATE MEMBER WITH A PROTECTIVE ELASTIC TUBULAR BODY

FIELD OF THE INVENTION

The invention concerns the fitting of a protective elastic tubular body on to an elongate member such as an electric cable or two electric cables joined to each other.

BACKGROUND TO THE INVENTION

It is known that such an elastic tubular body generally takes the form of a cap, closed at one end like a glove finger, or in the form of a sleeve, open at both ends; that such a body is manufactured from an elastic material with dimensions such that it is dilated relative to the natural state (which state it takes on in the absence of external stresses) when it contains within its internal space the elongate member, such that the body tightly fits around the elongate member; and that once it is fitted onto the elongate member, such a body provides air-tightness and water-tightness and/or electrical insulation.

Assemblies are already known comprising such a body and a tubular core for keeping the body expanded, that is to say in a radially dilated state relative to the natural state. The core is thus tightly covered by the tubular body. The internal space of the core is configured to receive internally the elongate member which is to be covered by the protective body.

With such an assembly, the fitting of the protective elastic tubular body onto the elongate member is carried out by inserting the elongate member into the internal space of the core then the core is driven such that it slides both in relation to the elongate member and in relation to the body. As it is no longer supported internally by the core, the body contracts onto the elongate member. When the core is fully extracted, the body tightly covers the elongate member.

PCT Application WO 95/11542 describes such an assembly, comprising:
  a protective elastic sleeve; and
  a tubular core for keeping the sleeve expanded, which core comprises a first part, which is rigid, and a second part joined end-to-end with the first part, which second part is flexible and turned back to rest on the outside circumferential surface of the first part, the core being configured in order for a pull applied to the first part at the end other than the end by which the first part and the second part are connected, makes the first part slide relative to the second part in an axial movement to attain an extended position in which the whole of the second part extends in line with the first part (the second part no longer has any turned-back portion).

In this assembly, the second part facilitates the extraction movement of the first part, which does not have to slide directly on the sleeve.

The second part does not stay in the sleeve but is driven out from it with the first part, given that the first part and the second part are joined end-to-end.

SUMMARY OF THE INVENTION

The invention is directed to providing an assembly of the same kind but which is more economic to obtain while remaining simple and convenient to use.

To that end the invention provides an assembly for tightly covering an elongate member of predetermined dimensions with a protective elastic tubular body open at one end at least, comprising:
  said elastic tubular body; and
  a tubular core for holding said elastic tubular body expanded, comprising a first part and a second part associated with the first part, the core being in an operating position in which the second part externally covers the first part with the first part accessible by the open end of the elastic tubular body, the core being configured for the elongate member to be able to be inserted into the internal space of the core in operating position and for a pull then applied on the first part by the open end of the elastic tubular body to make the first part slide relative to the second part in a an axial movement to reach an extended position in which the first part can no longer move relative to the second part in the direction of pulling;
  characterized in that the second part comprises a collar and legs axially projecting from the collar and connected to each other exclusively by the collar; in the operating position the collar and the legs surround the first part; and in the extended position the collar surrounds the first part and the legs are axially beyond the first part.

As in the earlier assembly mentioned above, in the assembly according to the invention the pulling applied to the first part of the core enables it to be moved axially relative to the elongate member and relative to the elastic tubular body in order for the latter to come to cover tightly the elongate member. The second part facilitates the extraction movement of the first part, which does not have to slide directly on the elastic tubular body. The second part does not remain in the elastic tubular body but is driven out from the elastic tubular body with the first part when it is extracted from the elastic tubular body.

On the other hand, in contrast to the earlier assembly mentioned above, in which the second part of the core is flexible, turned back over the outside surface of the first part and joined end-to-end to the first part, in the assembly according to the invention the first part slides conventionally in the second part, that is to say that the first part moves relative to the whole of the second part between the operating position and the extended position, which are conventionally fixed by end-of-travel stops.

The deformable nature of the second part of the core of the assembly according to the invention does not serve to turn back the second part over the first part, but to enable the portion of the second part axially beyond the first part, which portion is formed by the legs, to take a generally frusto-conical shape.

The portion of the second part axially beyond the first part takes a frusto-conical shape on account of the legs being acted upon by the elastic tubular body, which legs no longer surround the first part, on account of the legs tilting towards each other under the effect of that acting upon.

The generally frusto-conical shape taken by the portion of the second part axially beyond the first part facilitates the extraction of the second part from the elastic tubular body, that shape making it possible to profit from an expelling force from the second part by the elastic tubular body on account of the fact that it contracts, which makes the assembly according to the invention simple and convenient to use.

Obtaining the core of the assembly according to the invention, which simply requires associating the first part with the second part in order for them to be able to slide conventionally relative to each other, is much more economical than obtaining the core of the earlier assembly mentioned above, which requires joining end to end a rigid part and a flexible part then turning the flexible part back over the rigid part, which is relatively complex and costly.

For example, the first part and the second part of the core are of molded plastics material and are associated with each other by snap engagement.

According to other advantageous features:
- in at least one said leg there is formed, on its inner side, an axially oriented groove while said first part comprises a tab, said groove and said tab being configured for said tab to be able to slide along said groove;
- said groove is closed at the end by said collar, said tab coming into contact with the closed end of said groove in the extended position;
- said collar comprises in at least one portion situated between two said legs, on its inner side, a groove which is open at both its ends, said tab and said groove being configured in order for said tab to be able to slide along said groove from one end to the other, said first part and said second part being configured to slide relative to each other until said tab is located out of said groove between two said legs which are neighboring, and in order for an angular movement of the first part and of the second part relative to each other by forcing to be able to make said tab enter said groove provided in said leg;
- said first part comprises a hollow barrel in the form of a tube having said tab projecting relative to its outside general surface;
- said first part and said second part comprise members for checking the proper assembly of the first part and of the second part;
- said second part is configured in order to deform on account of the legs being acted upon by the elastic tubular body after the core has been brought from the operating position to the extended position, mainly by pivoting of the legs;
- said protective elastic tubular body is a cap closed at its opposite end to said open end; and/or
- in the natural state, said cap successively comprises, from its open end to its closed end, a first part of uniform diameter, a second flared part with a diameter which increases from the first part and a third part which is domed with its concave face on the inner side.

BRIEF DESCRIPTION OF THE DRAWINGS

The disclosure of the invention now continues with a detailed description of embodiments, given below by way of non-limiting illustration, with reference to the appended drawings. In these:

FIG. 1 is a perspective view of an assembly according to the present invention;

FIG. 2 is a cross-section view of an electric cable end portion on which is fitted the protective elastic cap comprised by the assembly of FIG. 1;

FIG. 3 is a similar view to FIG. 2, but showing the protective cap, in the natural state, that is to say in the state it takes on in the absence of external stresses;

FIG. 4 is a perspective view of the cap in the natural state;

FIG. 5 is a perspective view of the assembly of FIG. 1 after an electric cable end portion has been inserted into the space internal to its core and the first part of the core has been driven in the pulling direction, the illustrated position of the core being the extended position in which the first part can no longer move in relation to the second part in the pulling direction;

FIG. 6 is view similar to FIG. 5, but in elevation taken from the side which can be seen on the right in FIG. 5;

FIGS. 7 and 8 are views respectively in perspective and in elevation, similar to FIGS. 5 and 6, but showing the core of the assembly alone;

FIG. 9 is a similar view to FIG. 7, but with the core in operating position;

FIG. 10 is a plan view, taken from above, of the core in the operating position;

FIGS. 11 and 12 are perspective views respectively of the first part and of the second part of the core; and FIG. 13 is an elevation/cross-section view of the second part of the core.

DETAILED DESCRIPTION OF THE INVENTION

The assembly 10 shown in FIG. 1 comprises a protective elastic cap 11 and a core 12.

The cap 11 is of elastic plastics material, here EPDM, silicone or TPE (Thermoplastic Elastomer).

The core 12 is of relatively rigid plastics material, here ABS.

In the assembly 10, the cap 11 is expanded, that is to say in a radially dilated state relative to the natural state (FIGS. 3 and 4) that it adopts in the absence of external stresses. The core 12 is in operating position (FIG. 9) and holds the cap 11 expanded, which cap thus tightly covers the core 12.

The internal space of the core 12, in operating position, is configured to receive an elongate member, such as the electric cable end portion 13 illustrated in FIG. 2, which is to be covered by the cap 11.

The fitting of the cap 11 onto an elongate member is carried out by sliding the core 12 both relative to the elongate member which is fitted thereto and relative to the cap 11 in order for the cap to come to tightly cover the elongate member, as explained later in more detail.

FIG. 2 shows the electric cable end portion 13 on which is fitted the cap 11.

The cap 11 has the general shape of a finger of a glove extending from an open end 14 to a closed end 15.

As can be seen in FIGS. 3 and 4, the cap 11 successively comprises, from its open end 14 to its closed end 15, a first part 16, a second part 17 and a third part 18.

In the natural state, the first part 16 is of uniform diameter, the second part 17 is flared with a diameter which increases from the first part and the third part 18 is domed with its concave face on the inner side The third part 18 closes the cap 11 at its end 15.

Here, in the natural state, the second part 17 is frustoconical and the third part 18 is hemispherical.

The cap 11 is provided to cover an elongate member of which the diameter is comprised in a predetermined range.

The electric cable end portion 13 illustrated in FIG. 2 has the minimum diameter for which the cap 11 is provided.

As can be seen by comparing FIGS. 2 and 3, the diameter of the first part 16 of the cap 11 fitted on the cable end portion 13 is larger than in the natural state.

The cap 11 thus fits tightly around the electric cable end portion 13 by its first part 16.

The close contact between the electric cable end portion 13 and the cap 11 at the location of its first part 16 and the properties of the material in which the cap 11 is made, provide air tightness and water tightness as well as electrical insulation.

The maximum diameter which the elongate member may take to be covered by the cap 11 corresponds to the internal space of the core 12.

In the assembly 10, the cap 11 is expanded with the third part 18 substantially planar and slightly dilated while the second part 17 and the third part 18 are substantially of the same diameter as the periphery of the third part 18 so formed.

To obtain the assembly 10, the cap 11 is fitted onto the core 12 in operating position after having been dilated in well-known manner.

For example, the cap 11 is dilated with tooling comprising a mandrel of which the jaws are formed by metal rods. This mandrel serves to dilate the cap 11. The core is disposed inside the cap 11 then the tooling is moved axially relative to the cap and relative to the core.

It will be noted that the arrangement of the cap 11 with, in the natural state, the second part 17 flared and the third part 18 domed, limits the force to apply to dilate the cap 11.

The body 12 comprises a first part 20 and a second part 21 associated with the first part 20.

As indicated above, in the assembly 10 the core 12 is in an operating position.

In this position, the second part 21 externally covers the first part 20.

In the assembly 10, the first part 20 is accessible by the open end 14 of the cap 11.

On account of the generally tubular conformation of the core 12, an elongate member such as the end portion of an electrical cable 13 may be inserted into the internal space of the core 12 in operating position.

In practice, the elongate member is pushed into the internal space of the core 12 of the assembly 10 until the elongate member comes into contact with the third part 18 of the cap 11.

The core 12 is provided in order for a pull applied to the first part 20 by the open end 14 of the cap 11 to make the first part 20 slide relative to the second part 21 in an axial movement until the extended position shown in FIGS. 5 and 6 is reached in which the first part 20 can no longer move relative to the second part 21 in the direction of the pulling.

As can be seen in FIGS. 7 to 9, the second part 21 comprises a collar 22 and legs 23 projecting axially from the collar 22 and connected to each other exclusively by the collar 22.

In the operating position (FIGS. 1 and 9), the collar 22 and the legs 23 surround the first part 20.

In the extended position (FIGS. 5 to 8), the collar 22 surrounds the first part 20 and the legs 23 are axially beyond the first part 20.

On passage from the operating position to the extended position, the portion of the second part 21 axially beyond the first part 20, which portion is formed by the legs 23, progressively takes a generally frusto-conical shape, as can be clearly seen in FIGS. 5 and 6.

The portion of the second part 21 axially beyond the first part 20 takes a frusto-conical shape on account of the legs 23 being acted upon by the cap 11, which legs no longer surround the first part 20, on account of the legs 23 tilting towards each other under the effect of that acting upon.

In practice, the legs 23 tilt until their distal end bears on the elongate member such as the electric cable end portion 13.

As indicated above, the electric cable end portion 13 illustrated in FIG. 2, and also in FIGS. 5 and 6, has the minimum diameter for which the cap 11 is provided. When the elongate member has a greater diameter, the slope of the frusto-conical shape is less.

After the core 12 has attained the extended position shown in FIGS. 5 and 6, application of a pull is continued on the first part 20 to drive the second part 21 out from the cap 11 (the core 12 must be fully extracted from the cap 11).

The generally frusto-conical shape taken by the portion of the second part 21 axially beyond the first part 20 facilitates the extraction of the second part 21 from the cap 11, that shape making it possible to profit from an expelling force from the second part 21 by the cap 11 on account of the fact that it contracts.

In some cases, the expelling force is sufficient to drive the second part 21, only minimum pulling having to be applied to the first part 20.

Between the operating position (FIGS. 1 and 9) and the extended position (FIGS. 5 to 8), the pulling applied to the first part 20 enables it to be moved axially relative to the elongate member such as the cable end portion 13 and relative to the cap 11 in order for the cap to come to tightly cover the elongate member.

The second part 21 facilitates the extraction movement of the first part 20 which does not have to slide directly on the cap 11.

The first part 20 slides conventionally in the second part 21, that is to say that the first part 20 moves relative to the entirety of the second part 21 between the operating position and the extended position, which are conventionally fixed by end-of-travel stops.

A description will now be made in more detail of the first part 20 and the second part 21 of the core 12.

The first part 20 and the second part 21 are each manufactured from relatively rigid molded plastics material.

The first part 20 comprises a hollow barrel 25 in the form of a tube and two ears 26 which extend outwardly, transversely to the barrel 25 at its end provided to be situated by the open end 14 of the cap 11.

The ears 26 enable the first part 20 to be grasped.

At its end provided to be situated by the closed end 15 of the cap 11, the barrel 25 has first tabs 27 projecting relative to the general outside surface 28 of the barrel 25.

Here, there are four first tabs 27.

The barrel 25 also comprises, near the ears 26, second tabs 29 projecting from the general surface 28 of the barrel 25.

Here, there are four second tabs 29.

At each side, between the ears 26, the barrel 25 has a slot 30.

As explained above, the second part 21 comprises a collar 22 and legs 23 projecting axially from the collar 22 and connected to each other exclusively by the collar 22.

Here, there are six legs 23 in an equi-angular arrangement.

In each leg 23 there is formed, on the inner side, an axially oriented groove 31 which continues in the collar 22.

Each groove 31 is open at the distal end of the leg 23 and is closed at its other end, which is situated in the collar 23.

In each portion situated between two legs 23, half way between those two legs the collar 22 comprises, on the inner side, a groove 32 which is open at both its ends.

A notch 33 is formed in the material of the collar 22 at the location of the end of each groove 32 that is situated by the legs 23.

The first tabs 27 and the grooves 31 are configured so that the first tabs 27 can slide along the grooves 31, from one end to the other.

Similarly, first tabs 27 and the grooves 32 are configured so that the first tabs 27 can slide along the grooves 32, from one end to the other.

Lastly, the second tabs 29 and the grooves 32 are configured so that the second tabs 29 can be accommodated in the grooves 32.

The assembly of the first part 20 and of the second part 21 is carried out by simple snap engagement, by making each first tab 27 enter by force into a respective groove 31.

For this, the end of the first part 20 at which the collar 22 is located is placed facing the end of the second part 21 at which the first tabs 27 are located (opposite end to that at which the ears 26 are located) and the first tabs 27 are engaged in the grooves 32 of the collar 22.

Next the first part 20 and the second part 21 are made to slide axially relative to each other until the first tab 27 is located out of the groove 32 between two neighboring legs 23.

Next, the first part 20 and the second part 21 are moved angularly relative to each other by forcing a little to make each first tab 27 enter into the groove 31 of the leg 23 into contact with which the first tab 27 has come.

The association of the first part 20 and of the second part 21 is then terminated.

The first part 20 and the second part 21 may then slide relative to each other between two end-of-travel positions, respectively the operating position in which the collar 22 comes against the ears 26 and the extended position in which the first tabs 27 come into contact with the closed end of the grooves 31 situated in the collar 22.

In the operating position, each second tab 29 is accommodated in a respective groove 32.

This makes it possible to verify the proper assembly between the first part 20 and the second part 21. As a matter of fact, if second tabs 29 cannot enter into the grooves 32 of the collar, it is because the first part 20 and the second part 21 are not correctly oriented angularly relative to each other, and thus because the first tabs 27 are not in the grooves 31.

As a variant, there are no second tabs or other members for verifying the proper assembly of the first part and of the second part.

For considerations of convenience of molding, the first tabs 27 and the second tabs 29 are less numerous than the legs 23 and thus less numerous than the grooves 31 and the grooves 32 (there are four first tabs 27 and four second tabs 29 whereas there are six legs 23).

As a variant, there are as many tabs as legs or the difference between the number of tabs and the number of legs is different, for example the difference is one or three instead of being two; and/or where there is a difference some legs are not provided with a groove.

It will be noted that the legs 23 are configured to be relatively rigid, in order for the second part 21 not to deform by bending of the legs 23 or if so with little bending, but mainly by pivoting of the legs 23 in order for them to tilt towards each other, the deformation occurring for the most part in the collar 22.

In particular, the thickness and the width of the legs 23 (and therefore their number) have been determined for this.

Thus, the contact area of the legs 23 with the elongate member placed in the internal space of the core 22 remains small and the extraction of the core 22 is not hindered or is little hindered by the friction between the legs 23 and the elongate member.

What is more, the absence of bending of the legs 23 or in any event the little bending of the legs 23 is favorable to the sliding between the legs 23 and the cap 11, given that the bending would make the legs 23 concave by the cap 11.

As a variant, the number of legs 23 is different from six, for example four or eight.

The slot 30 and the notches 33 are breakage initiators to respectively break the first part 20 and the second part 21 to remove them from the elongate member after fitting the cap 11.

As a variant, the breakage initiators are different, for example holes or regions of wall of reduced thickness.

In variants not illustrated, the protective cap 11 is replaced by another protective elastic tubular body, for example a sleeve open at both ends, with a single core such as the core 12 if the sleeve is relatively short or with two cores such as the core 12 disposed as mirror images if the sleeve is relatively long.

Numerous other variants are possible according to circumstances, and in this connection it is to be noted that the invention is not limited to the examples described and shown.

The invention claimed is:

1. An assembly for tightly covering an elongate member (13) of predetermined dimensions with a protective elastic tubular body (11) with at least one open end (14), the assembly comprising:
    said elastic tubular body (11); and
    a tubular core (12) holding said elastic tubular body (11),
    the core (12) comprising a first part (20) and a second part (21) associated with the first part (20),
    the core (12) having an internal space,
    the core (12) having an operating position in which the second part (21) externally covers the first part (20) with the first part (20) being accessible by the at least one open end (14) of the elastic tubular body (11),
    the core (12) having an opening that, in the operating position of the core (12), accepts insertion of the elongate member (13) into the internal space of the core (12),
    wherein, with the elongate member (13) in the internal space of the core (12), a pulling force applied in a pulling direction on the first part (20) of the core (12) by the at least one open end (14) of the elastic tubular body (11) causes the first part (20) to slide relative to the second part (21) in an axial movement to reach an extended position of the core (12) in which the first part (20) can no longer move relative to the second part (21) in the pulling direction,
    wherein the second part (21) comprises a collar (22) and legs (23) axially projecting from the collar (22), the legs (23) being connected to each other exclusively by the collar (22), and
    wherein, i) in the operating position of the core (12), the collar (22) and the legs (23) surround the first part (20); and ii) in the extended position, the collar (22) surrounds the first part (20) and the legs (23) extend axially beyond the first part (20).

2. The assembly according to claim 1, wherein the first part (20) and the second part (21) of the core (12) are of molded plastics material and are associated with each other by snap engagement.

3. The assembly according to claim 2, wherein in at least one of said legs (23) there is formed, on an inner side thereof, an axially oriented groove (31) and said first part (20) comprises a tab (27), said tab (27) being slideable along said groove (31).

4. The assembly according to claim 3, wherein an end of said groove (31) by said collar (22) is a closed end, said tab (27) coming into contact with the closed end of said groove (31) in the extended position.

5. The assembly according to claim 2, wherein said first part (20) and said second part (21) comprise members (29, 32) that verify proper assembly of the first part (20) and of the second part (21).

6. The assembly according to claim 2, wherein said second part (21) is deformable on account of the legs (23) being acted upon by the elastic tubular body (11) after the core (12) has been brought from the operating position to the extended position, mainly by pivoting of the legs (23).

7. The assembly according to claim 2, wherein said protective elastic tubular body is a cap (11) with a closed end (15) opposite to said at least one open end (14).

8. The assembly according to claim 1, wherein in at least one of said legs (23) there is formed, on an inner side thereof, an axially oriented groove (31) and said first part (20) comprises a tab (27), said tab (27) being slideable along said groove (31).

9. The assembly according to claim 8, wherein an end of said groove (31) by said collar (22) is a closed end, said tab (27) coming into contact with the closed end of said groove (31) in the extended position.

10. The assembly according to claim 9, wherein said collar (22) comprises in at least one portion situated between two of said legs (23), on an inner side of said collar (22), another groove (32) which is open at both ends thereof, said tab (27) being slideable along said another groove (32) from one end to the other end, said first part (20) and said second part (21) being slideable relative to each other until said tab (27) is located out of said groove (32) between two of said legs (23) which are neighboring, such that forcing an angular movement of the first part (20) and of the second part (21) relative to each other causes said tab (27) to enter said groove (31) provided in said at least one of said legs (23).

11. The assembly according to claim 9, wherein said first part (20) comprises a hollow barrel (25) in the form of a tube having said tab (27) projecting relative to an outside general surface (28) thereof.

12. The assembly according to claim 8, wherein said collar (22) comprises in at least one portion situated between two of said legs (23), on an inner side of said collar (22), another groove (32) which is open at both ends thereof, said tab (27) being slideable along said another groove (32) from one end to the other end, said first part (20) and said second part (21) being slideable relative to each other until said tab (27) is located out of said groove (32) between two of said legs (23) which are neighboring, such that forcing an angular movement of the first part (20) and of the second part (21) relative to each other causes said tab (27) to enter said groove (31) provided in said at least one of said legs (23).

13. The assembly according to claim 12, wherein said first part (20) comprises a hollow barrel (25) in the form of a tube having said tab (27) projecting relative to an outside general surface (28) thereof.

14. The assembly according to claim 8, wherein said first part (20) comprises a hollow barrel (25) in the form of a tube having said tab (27) projecting relative to an outside general surface (28) thereof.

15. The assembly according to claim 1, wherein said first part (20) and said second part (21) comprise members (29, 32) that verify proper assembly of the first part (20) and of the second part (21).

16. The assembly according to claim 1, wherein said second part (21) is deformable on account of the legs (23) being acted upon by the elastic tubular body (11) after the core (12) has been brought from the operating position to the extended position, mainly by pivoting of the legs (23).

17. The assembly according to claim 1, wherein protective elastic tubular body is a cap (11) with a closed end (15) opposite to said at least one open end (14).

18. The assembly according to claim 17, wherein, in a natural state, said cap (11) successively comprises, from the at least one open end (14) to the closed end (15), a first part (16) of uniform diameter, a second flared part (17) with a diameter which increases from the first part (16) and a third part (18) which is domed with a concave face on the inner side thereof.

* * * * *